US011984783B2

(12) United States Patent
Stöck et al.

(10) Patent No.: US 11,984,783 B2
(45) Date of Patent: May 14, 2024

(54) STATOR, ELECTRIC MACHINE, AND MANUFACTURING PROCESS

(71) Applicant: JHEECO E-DRIVE AG, Eschen (LI)

(72) Inventors: Martin Stöck, Salez (CH); Roland Buol, Wangs (CH); Raphael Haas, Feldkirch (AT)

(73) Assignee: JHEECO E-DRIVE AG, Eschen (LI)

( * ) Notice: Subject to any disclaimer, the term of this patent is extended or adjusted under 35 U.S.C. 154(b) by 407 days.

(21) Appl. No.: 17/312,816

(22) PCT Filed: Dec. 11, 2019

(86) PCT No.: PCT/EP2019/084756
§ 371 (c)(1),
(2) Date: Jun. 10, 2021

(87) PCT Pub. No.: WO2020/120629
PCT Pub. Date: Jun. 18, 2020

(65) Prior Publication Data
US 2022/0131436 A1   Apr. 28, 2022

(30) Foreign Application Priority Data
Dec. 12, 2018   (DE) .................... 10 2018 131 960.6

(51) Int. Cl.
*H02K 3/50* (2006.01)
*H02K 3/12* (2006.01)
(Continued)

(52) U.S. Cl.
CPC ................ *H02K 3/50* (2013.01); *H02K 3/12* (2013.01); *H02K 3/32* (2013.01); *H02K 15/0068* (2013.01); *H02K 15/02* (2013.01)

(58) Field of Classification Search
CPC .. H02K 3/50; H02K 3/12; H02K 3/32; H02K 15/0068; H02K 15/02; H02K 15/064; H02K 15/085
See application file for complete search history.

(56) References Cited

U.S. PATENT DOCUMENTS

| 2003/0173841 A1 | 9/2003 | Kobayashi et al. |
| 2016/0276887 A1 | 9/2016 | Watanabe et al. |
| 2017/0025913 A1 | 1/2017 | Nagahiro et al. |

FOREIGN PATENT DOCUMENTS

JP   2010239798 A   10/2010

OTHER PUBLICATIONS

English translation of JP-2010-239798A (Year: 2010).*
English Translation of International Search Report from PCT/EP2019/084756 dated Mar. 26, 2020.

* cited by examiner

*Primary Examiner* — Tulsidas C Patel
*Assistant Examiner* — Joshua Kiel M Rodriguez
(74) *Attorney, Agent, or Firm* — Calfee, Halter & Griswold LLP (57) ABSTRACT

The invention relates to a stator for an electric machine, comprising a plurality of rod conductors and at least one insulation disk that is arranged in an end face region of the stator and includes a plurality of interconnection pieces. Rod conductor contact surfaces and interconnection piece contact surfaces have corresponding shapes such that a planar contact can be created; for this purpose, the interconnection piece protrude from the insulation disk in the radial direction at least along the interconnection piece contact surface such that a plurality of interconnection piece contact surfaces can simultaneously come into contact with the associated rod conductor contact surfaces. The invention further related to an electric machine and to a manufacturing process.

17 Claims, 9 Drawing Sheets

(51) Int. Cl.
*H02K 3/32* (2006.01)
*H02K 15/00* (2006.01)
*H02K 15/02* (2006.01)

STATOR, ELECTRIC MACHINE, AND MANUFACTURING PROCESS

CROSS-REFERENCE TO RELATED APPLICATIONS

The present application is the national stage of PCT Application No. PCT[/EP2019/084756, filed on Dec. 11, 2019, which claims priority to the German patent application No. 102018131960.6, filed on Dec. 12, 2018, which are incorporated herein by reference in their entireties.

The invention relates to a stator for an electric machine. Furthermore, the invention relates to an electrical machine and a method of manufacture.

Composite windings are windings constructed from segment conductors or rod conductors. The segment conductors are connected directly, by bending them towards each other, or indirectly via interconnection pieces to form half-windings.

From the prior art it is known to connect segment conductors so as to form half-windings via separate copper connectors or interconnection pieces. It is difficult to exactly position the interconnection pieces and the rod conductors relative to each other for subsequent electrical contacting or connection. In U.S. Pat. No. 9,118,224 B2, the relative positioning and electrical contacting is solved by screw or pin elements. The interconnection pieces must be placed individually for this purpose. Therefore, assembly is very time-consuming.

Alternatively, it is known to connect the segment conductors directly, i.e. without interconnection pieces. The segment conductors are brought into contact with each other by means of positioning tools and are then welded directly. DE 11 2015 001 994 A5 shows, for example, a winding head for compression-molded wire strands or stranded wires, in which the stranded wires are bent towards each other for connection and welded together. However, the resulting winding head has a large overall height.

It is the object of the present invention to provide a stator, which enables the interconnection of rod conductors in a simplified and cost-effective manner for the provision of composite windings, which further provides optimized process reliability for safe electrical connection, and which has a reduced installation space. Furthermore, it is the object of the present invention to disclose an electrical machine and a method for manufacturing the same.

This object is solved with respect to the stator by claim 1, with respect to the electric machine by claim 9 and with respect to the manufacturing method by claim 10. Preferred embodiments are defined in the dependent claims.

According to the present invention, a stator for an electric machine is provided with a plurality of rod conductors radially distributed about an axis of rotation of the stator and each spaced apart from the other so that the rod conductors extend in the longitudinal direction of the axis of rotation, and with at least one insulation disk arranged in an end face region of the stator. The insulation disk, in particular an annular insulation disk, has a plurality of interconnection pieces, one interconnection piece in each case being assigned to two rod conductors for forming an electrical connection. A rod contact surface is formed at the longitudinal ends of each rod conductor and interconnection piece contact surfaces are formed at the ends of each interconnection piece, the rod contact surfaces and the interconnection piece contact surfaces each being designed to correspond to one another so that a surface contact can be provided. The interconnection pieces protrude radially from the insulation disk at least along the interconnection piece contact surfaces, so that several interconnection piece contact surfaces, preferably all interconnection piece contact surfaces, may be contacted simultaneously with the respectively associated rod conductor contact surfaces.

The invention is based on the basic idea of providing simplified positioning and contacting of the rod conductors for forming composite windings by means of the insulation disks having the interconnection pieces. In particular, this is also to be ensured by advantageous positioning and design of the contact surfaces of the rod conductors as well as the interconnection pieces.

Furthermore, the use of the insulation disks including the interconnection pieces is intended to allow saving in installation space, preferably both in the circumferential direction and in the longitudinal direction of the axis of rotation of the stator.

In particular, the stator may be provided for an electric machine, i.e. a synchronous machine or an asynchronous machine.

Furthermore, rod conductors in the sense of the invention may be understood in particular as electrical conductors for forming composite windings. Accordingly, rod conductors may be single-piece (solid conductors) or multi-piece (stranded wires) and may, for example, be in the form of hairpins or may be I-shaped (I-pins). In particular, rod conductors may also be designed as compression-molded wire strands.

Furthermore, the at least one insulation disk is arranged in an end face region of the stator. The end face regions are in particular the opposite, longitudinal ends of the rod conductors. One or more insulation disks may be provided at each of the longitudinal ends or in the region along the longitudinal ends of the rod conductors.

Preferably, a plurality of insulation disks including interconnection pieces are arranged in the respective end face regions of the stator for forming planes or interconnection planes in order to appropriately electrically interconnect all the rod conductors by means of the respective interconnection pieces, in particular for providing composite windings.

The at least one insulation disk is preferably annular in shape and has a plurality of interconnection pieces, wherein one interconnection piece is assigned to two rod conductors for forming an electrical connection. The interconnection pieces may be assigned and arranged relatively to the rod conductors in a modular manner.

A rod conductor contact surface is formed at the longitudinal ends of each rod conductor and interconnection piece contact surfaces are formed at the ends of each interconnection piece, the rod conductor contact surfaces and the interconnection piece contact surfaces each being designed to correspond to one another so that a surface contact may be provided. Preferably, the corresponding contact surfaces may be designed in such a way that the contact surfaces come into contact with one another when the stator is assembled, in particular in the course of a rotational movement for pre-positioning.

Instead of a rotational movement, there may also be an axial feed motion of the interconnection pieces or insulation disks along a stator axis. Alternatively, a lateral feed motion may also take place in a plane transverse to the longitudinal axis of the stator. In the latter case in particular, the interconnection pieces may be held with clearance in the insulation disks for this purpose. In this case, only the interconnection pieces are moved laterally and relatively to the insulation disk, after the insulation disk has been fitted in order to establish the surface contact. Furthermore, the interconnection pieces protrude radially from the insulation disk at least along the interconnection piece contact surfaces, such that all interconnection piece contact surfaces may be simultaneously contacted with the respectively associated rod conductor contact surfaces, i.e. with a single (rotational) movement of the respective insulation disk, in particular for forming at least one composite winding of the stator. The insulation disk may be designed as an annular disk, with the interconnection pieces projecting beyond an inner diameter of the insulation disk to enable electrical contacting with the rod conductors.

According to a particularly preferred embodiment, the rod conductor contact surfaces and the respective associated interconnection piece contact surfaces may be contacted with one another by rotating the insulation disk along the axis of rotation of the stator.

Preferably, the insulation disk may have gripping grooves and/or holes or the like for twisting/rotating and holding the insulation disk by means of a tool, in particular for holding a preloaded surface contact between interconnection pieces and segment conductors.

By means of the contacting, preferably a pre-stressed contacting, of the rod conductor contact surfaces and the interconnection piece contact surfaces, a secure pre-positioning and contacting of the mutually associated rod conductors and interconnection pieces may be achieved, in particular before a force-locking and/or form-locking and/or material-locking connection is made.

In one embodiment, the at least one insulation disk has a plurality of grooves for receiving the interconnection pieces, or the plurality of interconnection pieces is integrally cast in the insulation disk.

In this manner, one obtains a simple arrangement of the interconnection pieces along the insulation disk and a simplified pre-positioning relative to the rod conductors. Furthermore, electrical insulation of the interconnection pieces at least along sections may be provided.

In a further embodiment, the insulation disk has a resin or polymer, in particular a castable or injectable resin or polymer, for manufacturing the insulation disk in a casting process.

Simple and secure positioning of the interconnection pieces along the insulation disk may be achieved, in particular for appropriate contacting with the rod conductors. Furthermore, the castable or injection-moldable resin or polymer may be used to simplify electrical insulation of the interconnection pieces, at least in sections.

According to one embodiment, the interconnection pieces and the rod conductors form a resilient connection for providing a pre-stressed surface contact between the mutually associated rod conductor contact surfaces and interconnection piece contact surfaces.

A subsequent electrical contacting between the rod conductors and the interconnection pieces may be then provided by means of the preloaded surface contact.

According to one embodiment, the interconnection pieces in contact with the rod conductors form a zero gap along the interconnection piece contact surfaces and the rod conductor contact surfaces in each case, so that the interconnection pieces may be connected to the associated rod conductors in a force-locking and/or form-locking and/or material-locking manner, in particular these components may be welded to each other by means of a beam welding process, preferably a laser or electron welding process, a resistance welding process, an ultrasonic welding process or a friction welding process or friction stir welding. Arc welding is also possible.

By providing the preferably preloaded surface contact between the interconnection pieces and the rod conductors, a high-quality electrical connection may be established. In particular, the force-locking and/or form-locking and/or material-locking connection between the interconnection pieces and the rod conductors may be established on the basis of the preloaded surface contact by means of a welding process.

A zero gap is to be understood in particular as a gap, which is configured such that at least in some areas there is a stop between the contact surfaces of the interconnection piece and the rod conductor, and/or a beam welding process is possible.

According to one embodiment, the longitudinal ends of the interconnection pieces are wedge-shaped—as seen in axial plan view—, or L-shaped. The ends may also be rectangular. In another embodiment, the ends of the interconnection pieces—seen in a plane through the longitudinal axis of the stator—are wedge-shaped or rectangular.

In a further embodiment, the ends of the interconnection pieces, in particular the contact surfaces of the interconnection pieces, are angled. Angled means that the contact surface of the interconnection piece forms an angle with the tangent of a circle perpendicular to the stator axis and around the stator axis with a radius such that it passes through the contact surface of the interconnection piece, wherein the angle is not equal to an even multiple of 90°.

Preferably, the longitudinal ends of the rod conductors, in particular in the area of the contact surfaces, are formed with a shape that corresponds to the interconnection pieces. For example, the longitudinal ends of the rod conductors may be wedge-shaped or cuboid-shaped, in particular with a rectangular or square cross section, or L-shaped.

By means of longitudinal ends of the rod conductors and the interconnection pieces that mutually correspond to each other, a pre-stressed or pre-loaded surface contact may be provided in the course of a pre-positioning, preferably a rotational twist for preloaded contacting.

In a further preferred embodiment, the rod conductors are each point-symmetrical in cross section at or above the height of the rod conductor contact surfaces, in particular in the form of a parallelogram, so that identical current path lengths are present over the cross section of the rod conductors.

Thus, current paths of equal length may be ensured, so that in the course of, for example, resistance welding or ultrasonic welding, a uniform force-locking and/or form-locking and/or material-locking connection may be produced along the entire extent of the contact surfaces of the rod conductors and the interconnection pieces.

In a further independent aspect of the invention, there is provided an electrical machine having a stator in accordance with the present invention. Preferably, the electrical machine may be embodied as an electric motor, a synchronous motor or an asynchronous motor, a generator or the like.

In another independent aspect of the invention, there is provided a method of manufacturing a stator or electric machine according to the invention, comprising the following steps:
concentrically aligning the insulation disk with respect to the plurality of rod conductors radially distributed about the axis of rotation and spaced apart from each other, respectively;
placing the insulation disk at a front end of the stator so that a rod conductor contact surface and an interconnection piece contact surface are respectively opposed to each other;

rotating the insulation disk about the axis of rotation so that a surface contact, in particular a preloaded surface contact, is produced between the rod contact surfaces and the connection piece contact surfaces.

The latter step may be omitted when producing a surface contact by axial displacement. When producing a surface contact by lateral displacement of only the interconnection pieces, see above, the latter step may be replaced accordingly.

By placing and rotating the at least one insulation disk including the interconnection pieces a pre-positioning of the interconnection pieces relative to the rod conductors is possible in a simple manner. In particular, a pre-stressed surface contact may be provided, as an advantageous initial state for e.g. welding, for electrical connection of the contact surfaces. In a preferred embodiment, the mutually associated rod conductors and interconnection pieces are connected, in particular welded, to one another along the rod conductor contact surfaces and interconnection piece contact surfaces that are in contact with one another in a force-locking and/or form-locking and/or material-locking manner.

In particular, the electrical connection for all the rod conductors and interconnection pieces of an interconnection plane or an insulation disk may be made in one continuous process. The individual rod conductor contact surfaces and interconnection piece contact surfaces, which are in surface contact, may be connected to each other, in particular welded, in a force-locking and/or form-locking and/or material-locking manner directly one after the other or simultaneously. The preloaded surface contact between the rod conductors and the interconnection pieces represents an advantageous initial state for establishing the electrical connection in a simple and reliable manner.

According to a further preferred embodiment, a cover part is placed on the insulation disk.

The cover part may be formed as a ring or as an end cover, in particular at the longitudinal ends of the stator. Thus, a longitudinal termination of the assembled windings of the stator is provided.

According to a preferred embodiment, the interconnection pieces are connected to the associated rod conductors in a force-locking and/or form-locking and/or material-locking manner after positioning of the cover part.

In particular, the cover part may comprise a material that allows, for example, beam welding. In this sense, the cover part may be insensitive to the connection process for electrically connecting the rod conductors to the interconnection pieces.

Optionally, the cover part may have a transparent material so that a welding beam may pass through the cover part without significant energy loss and the energy may be appropriately absorbed in the welding gap provided in each case between the interconnection piece contact surface and the rod conductor contact surface. In this sense, the cover part may be suitably formed for laser transmission welding.

In the following, the invention is explained in detail with reference to the accompanying drawings by means of several exemplary embodiments.

In the drawings:

FIGS. 17*a*-19*b* schematically show three different variants of an assembly process for establishing the surface contact by axial positioning of the interconnection pieces FIGS. 20*a*-22*b* schematically show three different variants of an assembly process for establishing the surface contact by lateral movement of the interconnection pieces.

FIG. 1 shows a perspective exploded view of a stator 1 according to the invention. Accordingly, the components of the stator 1 are arranged concentrically along an axis of rotation X.

Figure 1:
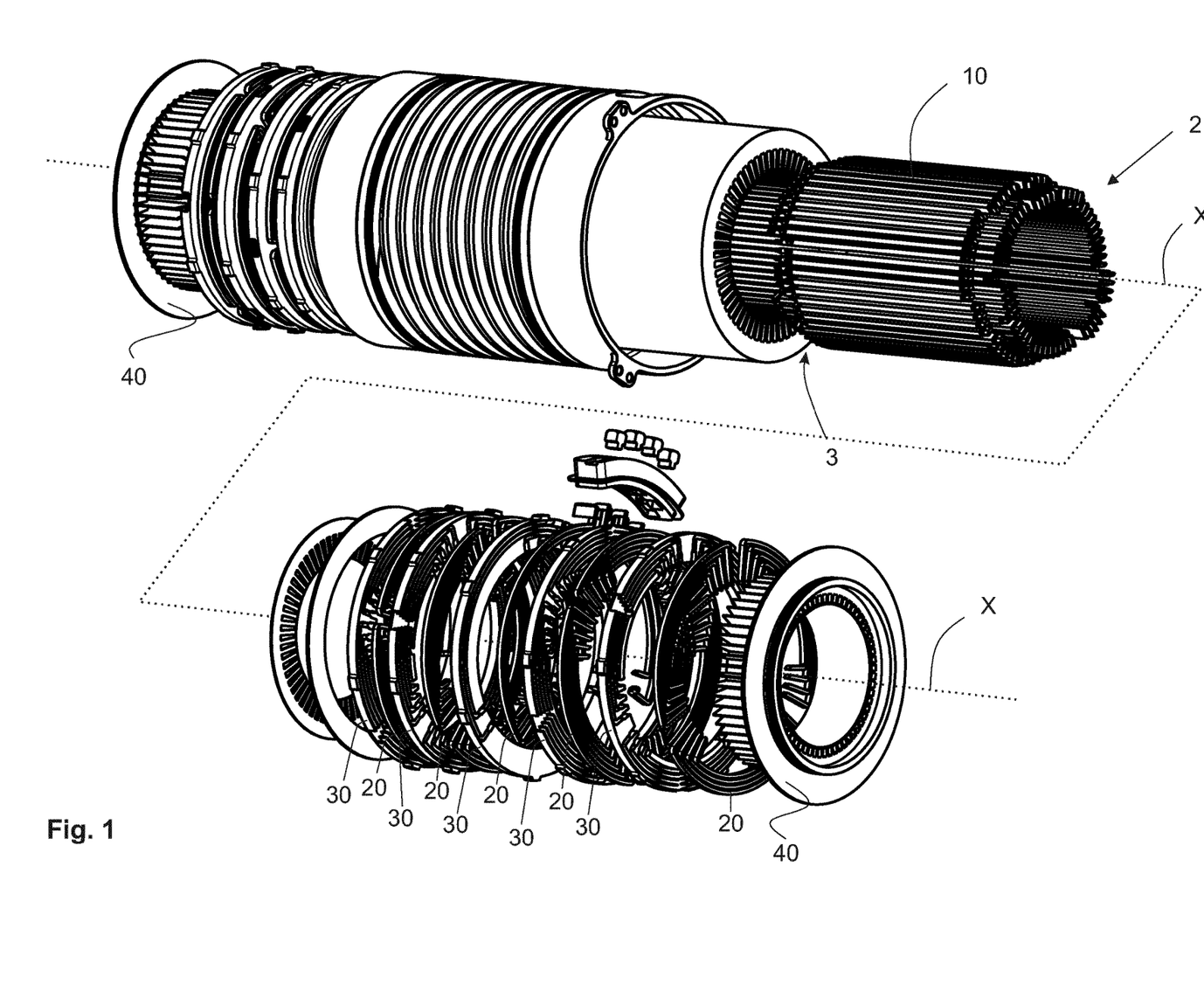
FIG. 1 schematically shows perspective exploded view of a stator according to the invention.

The stator 1 is formed with radially distributed and spaced-apart rod conductors 10, which extend in the longitudinal direction of the axis of rotation X. Longitudinal ends of the rod conductors 10 represent or form opposing end face regions 2; 3 of the stator 1.

Furthermore, the stator 1 has a plurality of insulation disks 30, each having a plurality of interconnection pieces 20.

An annular cover part 40 is arranged at each of the end face regions 2; 3 of the stator 1. The cover parts 40 constitute an enclosure of the insulation disks 30 and, thus, the terminations on both sides of the stator 1.

The cover parts 40 each have separating fins, which may extend, in particular in the longitudinal direction of the axis of rotation X, between the rod conductors 10 or the interconnection pieces 20, in particular for the respective spacing or insulation.

Figure 2:
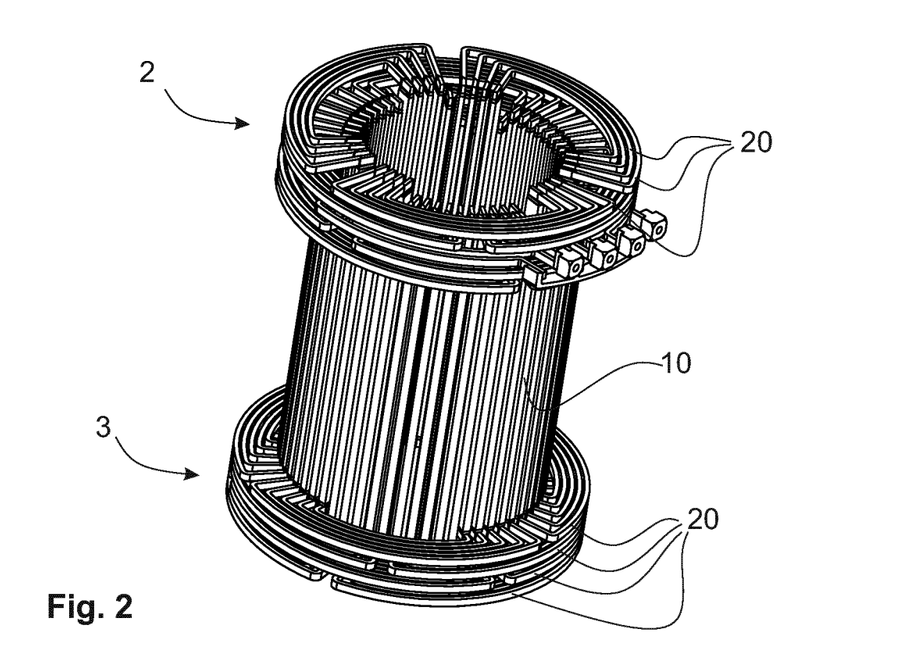
FIG. 2 schematically shows perspective view of the assembled windings of a stator according to the invention.

FIG. 2 shows a perspective view of the assembled windings of a stator 1 according to the invention.

In the end face regions of the stator 2; 3 and at the longitudinal ends of the rod conductors 10, respectively, several arrangements of interconnection pieces 20 are provided. Thus, the insulation disks 30 form different interconnection planes or layers with the interconnection pieces 20 in order to achieve an appropriate interconnection of the rod conductors 10 for providing composite windings.

Preferably, in addition to the individual interconnection planes, a connection plane with phase connections for current or voltage supply is further shown at the upper end face region 2, in particular for leading out the winding phase and/or for bringing together the winding phases to form a star point.

Figure 3:
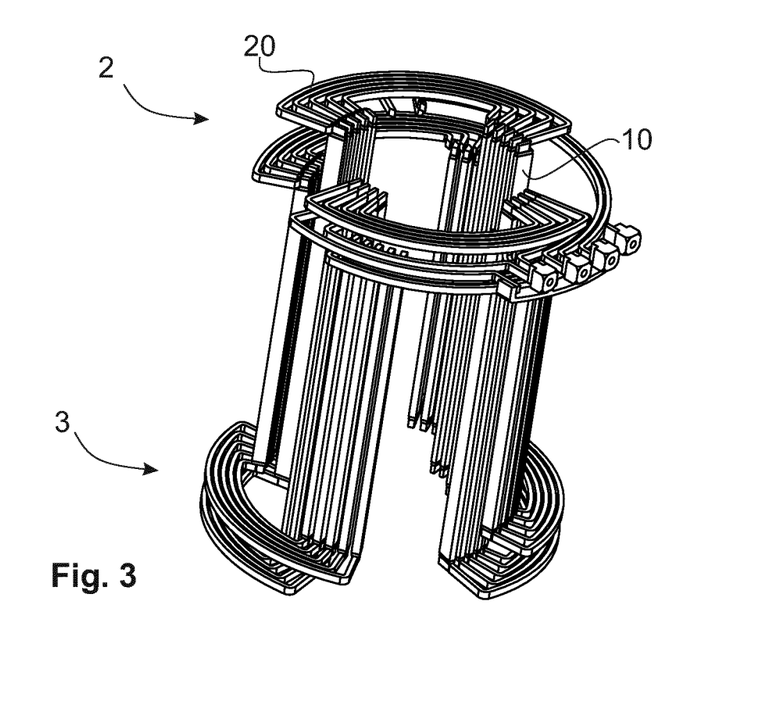
FIG. 3 schematically shows an illustration of a single phase of the composite windings according to FIG. 2.

FIG. 3 shows a representation of a single phase of the composite windings according to FIG. 2.

In particular, it can be seen that the interconnection pieces 20 are each C-shaped. Thus, the interconnection pieces 20 may be interleaved to form an interconnection piece group.

According to FIG. 3, a phase runs along the rod conductors 10 between different planes of interconnection pieces 20. Thus, this allows interleaving the interconnection pieces 20 with the electrically connected rod conductors 10 to form different phases.

Referring to FIGS. 2 and 3, a space-saving arrangement or interconnection of the composite windings may be enabled by arranging the interconnection pieces 20 at different planes or layers.

In FIGS. 4a-e, perspective illustrations of insulation disks with associated interconnection pieces are shown.

It is clear from FIGS. 4a-e that the configuration of the insulating disks 30 with the interconnection pieces 20 may differ along the individual interconnection planes in order to enable an appropriate interconnection of the rod conductors 10 and thus an appropriate configuration of the composite windings.

Figure 4:
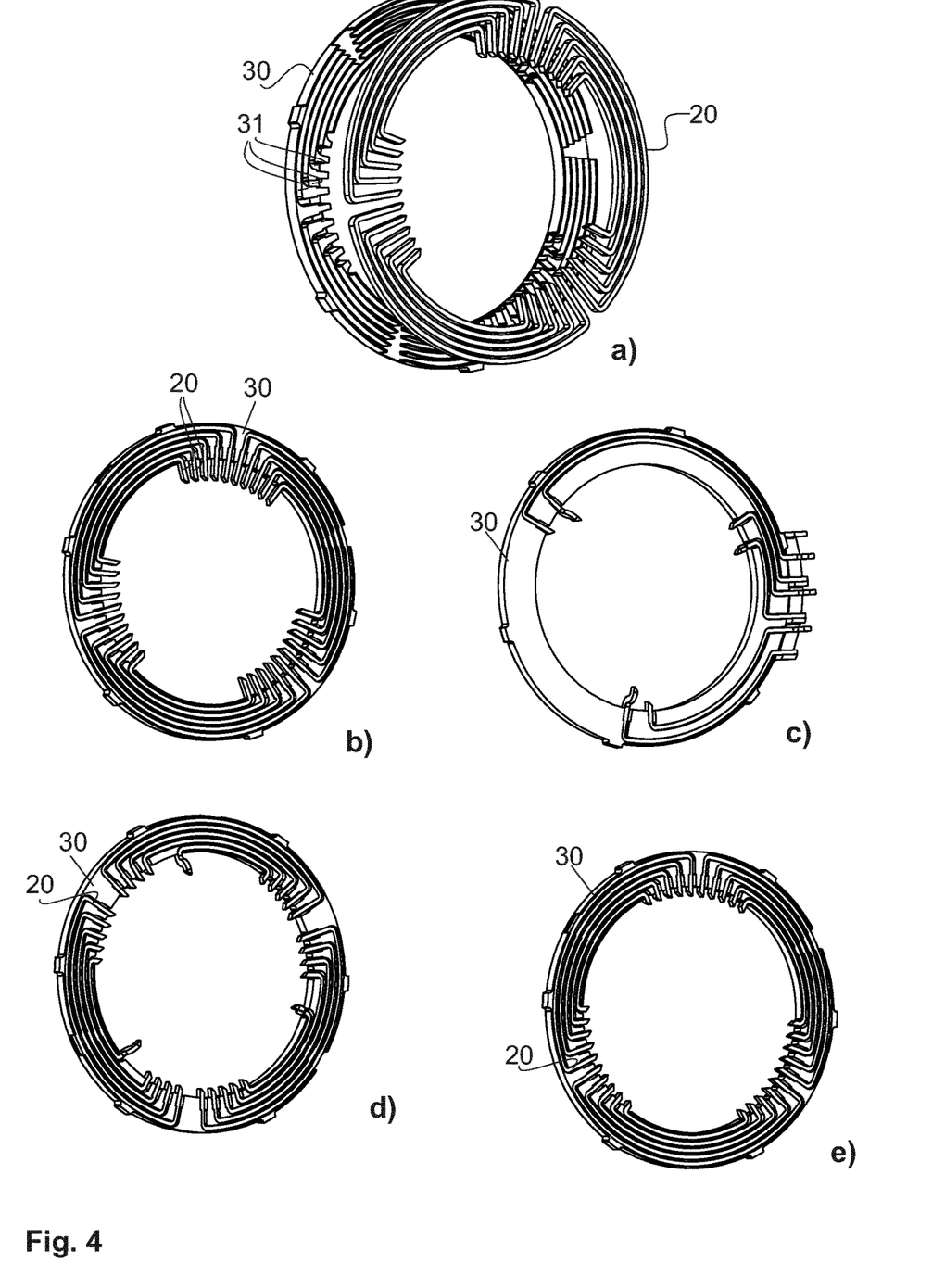
FIG. 4 schematically shows perspective illustrations of insulation disks with associated interconnection pieces.

Furthermore, in particular according to FIG. 4a, the insulation disk 30 is provided with grooves 31 for receiving the interconnection pieces 20. The interconnection pieces 20 may be inserted into or received in the grooves 31 of the insulation disk 30. Thus, a specific pre-positioning as well as a sectional electrical insulation of the interconnection pieces 20 may be accomplished by means of the respective insulation disk 30. Furthermore, FIG. 4c shows the design of the interconnection pieces 20 for providing a connection plane. In this way, the rod conductors 10 or interconnection pieces 20 may be appropriately supplied with current or voltage.

Figure 5A:
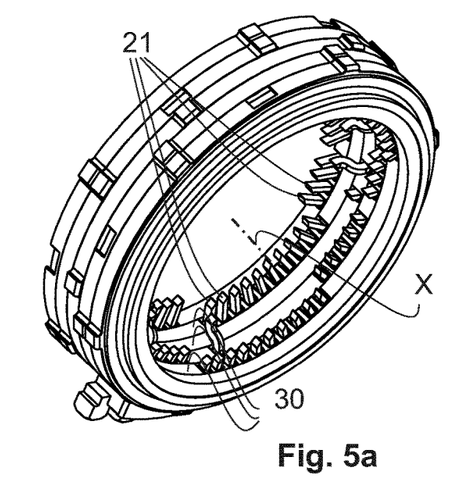
FIG. 5 schematically shows a perspective view of stacked insulation disks with interconnection pieces inserted.
Figure 5B:
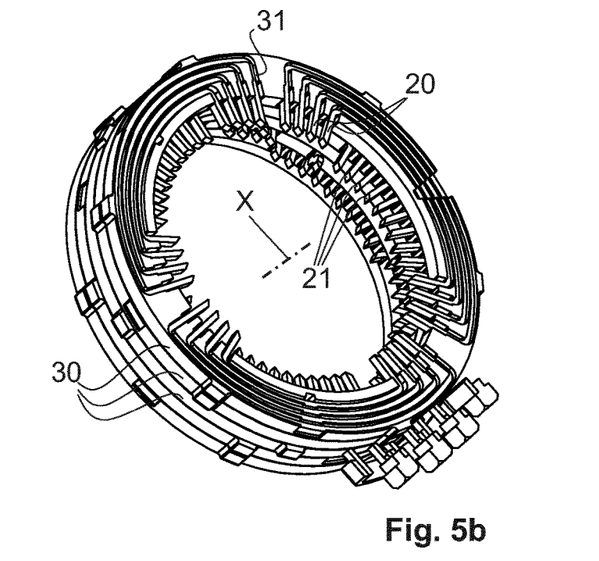

In FIGS. 5a-b, there is shown a perspective view of stacked insulation disks with inserted interconnection pieces 20.

The different insulation disks 30 with the respective interconnection pieces 20 are arranged directly on top of each other. The ends of the interconnection pieces 20 protrude in the radial direction from the insulation disks 30 in each case in order to permit appropriate electrical contacting. In particular, the interconnection pieces 20 protrude beyond an inner diameter of the annular insulation disks 30, and thus in the direction of the axis of rotation X of the stator 1.

The staggered arrangement of the ends of the interconnection pieces 20 enables advantageous interconnection and contacting with the rod conductors 10.

Figure 6A:
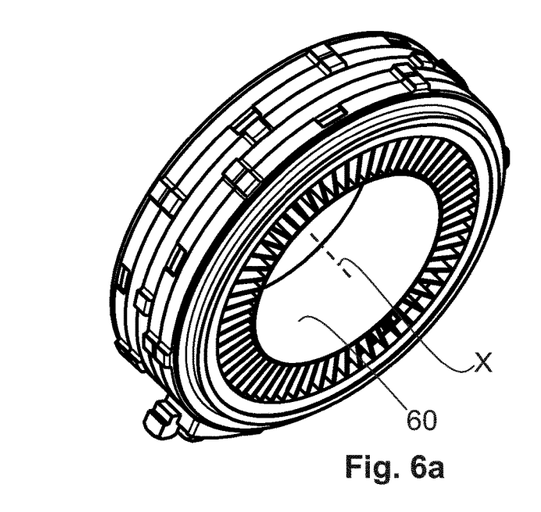
FIGS. 6*a-b* schematically show perspective views of insulation disks according to FIG. 5*a-b* with cover part and insulation star.
Figure 6B:
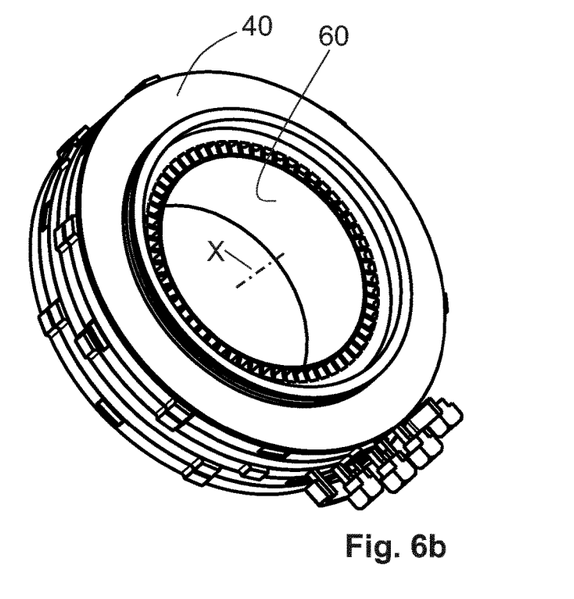

FIGS. 6a-b show a perspective view of the insulation disks 30 according to FIGS. 5a-b with cover part 40 and insulation star 60.

The cover part 40 terminates the arrangement of the insulation disks 30 in the longitudinal direction. The insulation star 60 is arranged concentrically to the insulation disks 30 and at the inner diameter of the annular insulation disks 30. Thus, the insulation star 60 terminates the arrangement of the insulation disks 30 with the interconnection pieces 20 in the radial direction, in particular for delineating with respect to a rotor to be accommodated or arranged for forming an electrical machine. Cover part 40 and insulation star 60 are formed as single pieces.

The insulation star 60 is formed with a circumferential surface, at the outer circumference of which partition walls are arranged so as to extend in a star-like shape. The partition walls extend in the longitudinal direction of the circumferential surface of the insulation star 60. By means of the insulation star 60, it is thus possible to provide appropriate electrical insulation of the rod conductors 10 from one another and contacting of the rod conductors 10 with the interconnection pieces 20 along the insulation disks 30.

Figure 7A:
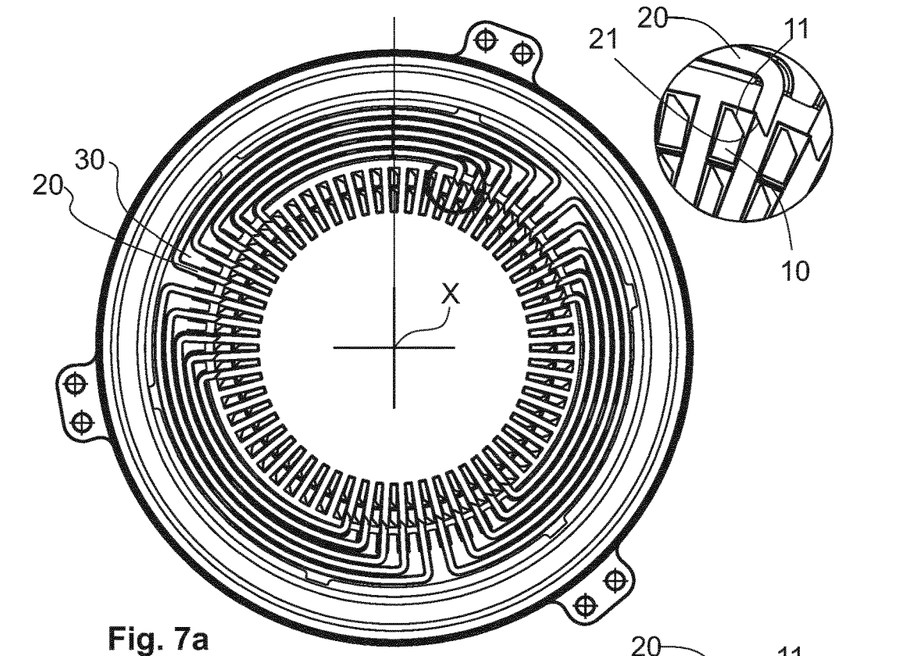
FIGS. 7*a-b* schematically show illustrations of the pre-positioning of an insulation disk.
Figure 7B:
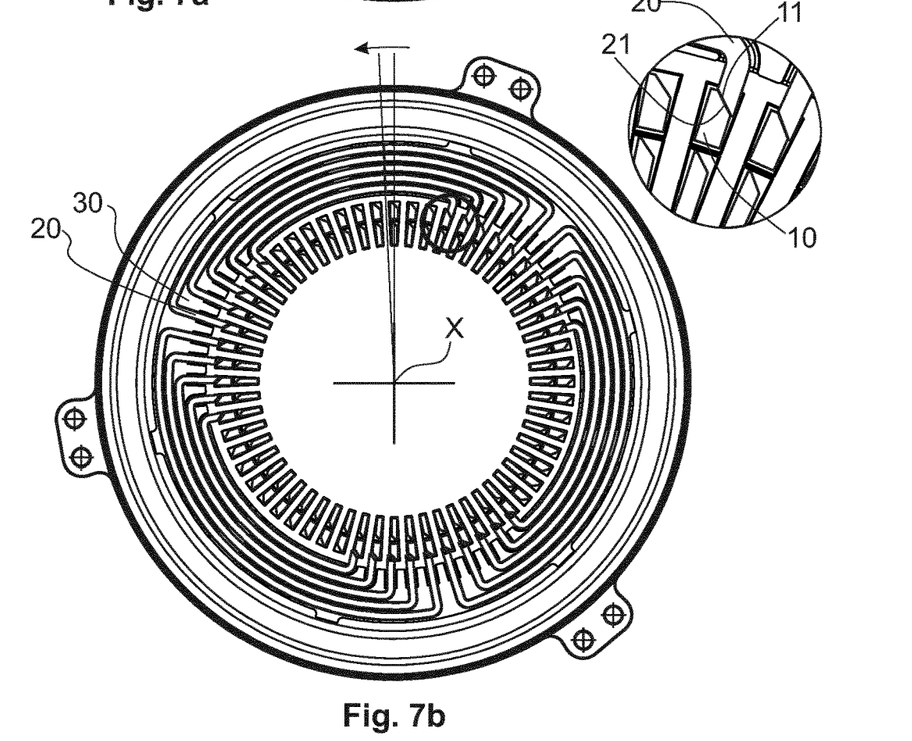

In FIGS. 7a-b, there is shown an illustration of the pre-positioning of an insulation disk 30.

FIG. 7a shows the offset between the interconnection pieces 20 and the rod conductors 10 after concentric positioning of the insulation disk 30. Rod conductor contact surfaces 11 and interconnection piece contact surfaces 21 are still arranged separately from each other. According to FIG. 7a, the contact surfaces 11; 21 of the rod conductors 10 and the interconnection pieces 20 may be formed so as to correspond to each other, with ends of the interconnection pieces 20 and head ends of the rod conductors 10 each being wedge-shaped. The wedge shape here refers to a view perpendicular to the longitudinal axis X of the stator.

According to FIG. 7b, a preferably preloaded surface contact between the interconnection piece contact surfaces 21 and the rod conductor contact surfaces 11 is established in the course of a rotation of the insulation disk 30 for pre-positioning the interconnection pieces 20. Thus, a reliable contacting of the rod conductors 10 with the interconnection pieces 20 may be provided. In this contacted state, a simple and reliable connection of the rod conductors 10 with the interconnection pieces 20 may be established, preferably in the course of a welding process such as, for example, a beam welding, a resistance welding or an ultrasonic welding. Due to the wedge shape, in particular axial accessibility is maintained, so that welding may be performed with a welding beam perpendicular to the longitudinal axis of the stator X.

Figure 8A:
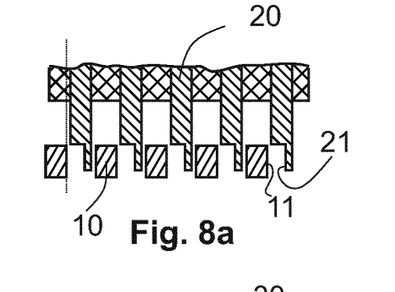
FIGS. 8*a-b* schematically show illustrations of the pre-positioning for an L-shaped geometry of the interconnection pieces.
Figure 8B:
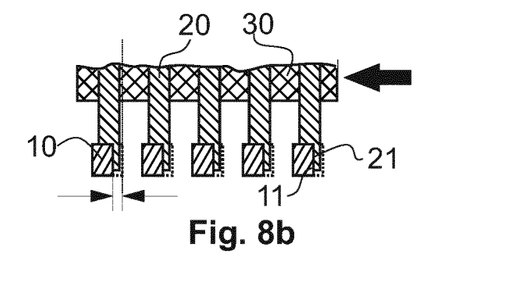

FIGS. 8a-b show a representation of the pre-positioning for an L-shaped geometry of the interconnection pieces 20 in a top view perpendicular to the stator axis X.

In the sense of FIGS. 7a-b, a relative displacement between the interconnection pieces 20 and the rod conductors 10 takes place according to FIGS. 8a-b in order to provide a contact in the course of the pre-positioning.

The rod conductors 10 may be rectangular or square or have a rectangular or square cross-section. The interconnection pieces 20 may be L-shaped at their ends.

Figure 9A:
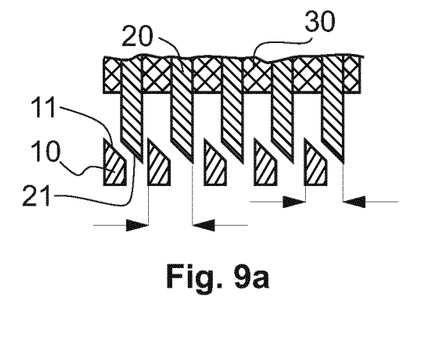
FIGS. 9*a-b* schematically show illustrations of pre-positioning for a wedge-shaped geometry of the interconnection pieces.
Figure 9B:
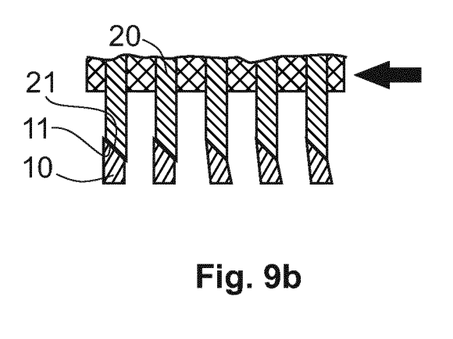

In FIGS. 9a-b, an illustration of the pre-positioning for a wedge-shaped or wedge-shapedly configured geometry of the interconnection pieces 20 is shown.

In order to provide a preloaded surface contact along the mutually associated rod conductor contact surfaces 11 and the interconnection piece contact surfaces 21, a relative displacement is applied, in particular in the form of a rotation of the insulation disk 30 with the respective associated interconnection pieces 20. According to FIG. 9b, an incorrect positioning, e.g. of individual rod conductors 10 and/or interconnection pieces 20, may also be compensated here.

Figure 10:
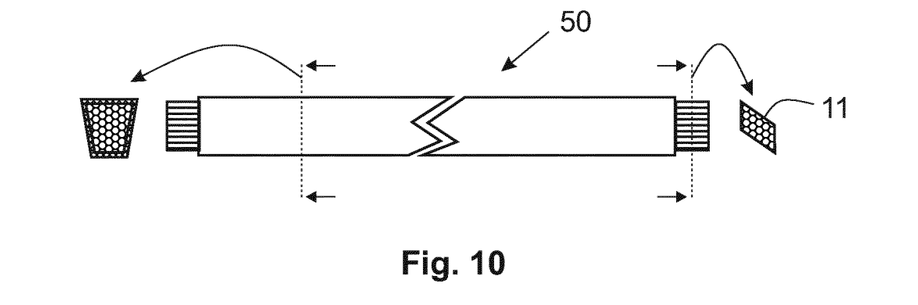
FIG. 10 schematically shows an illustration of an exemplary shaped strand with parallelogram-shaped welding to compensate for a positioning error.

FIG. 10 shows an illustration of an exemplary shaped strand 50.

The shaped strand 50 consists of individual wires, which are electrically contacted with each other in the head region by electrode resistance welding. The shaped strand head is resistance welded in a parallelogram shape according to FIG. 10. In this way, a positioning error as shown in FIG. 9a-b may be circumvented or compensated for. The remaining shaped strand may have a different cross-sectional shape as shown here, for example trapezoidal.

Figure 11:
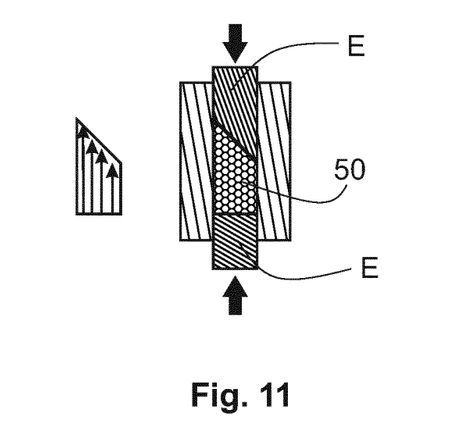
FIG. 11 schematically shows an illustration of welding the heads of shaped strands with current paths of unequal length.

FIG. 11 shows an illustration of the welding, by electrode heads E, of the heads of shaped strands 50 with current paths of unequal length. Due to the non-identical contact surfaces of the shaped strands 50, in particular a bevelled contact surface and a rectangular contact surface, current paths of unequal length dimensions are present. In the course of a resistance welding process, for example, this leads to electrical joints of inferior quality.

Figure 12:
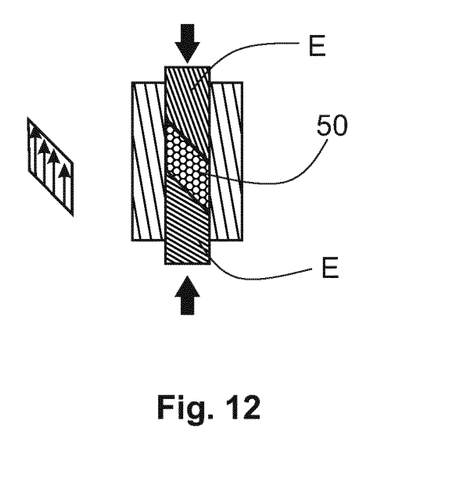
FIG. 12 schematically shows an illustration of welding the heads of shaped strands with current paths of equal length.

FIG. 12 shows an illustration of resistance welding, by electrode heads E, of the heads of shaped strands 50 with current paths of equal length. According to FIG. 12, the contact surfaces for resistance welding are each parallel and oblique, in particular point-symmetrical and corresponding to each other. Using identically long current paths, high-quality, reliable welds of the contact surfaces, i.e. of all wires of the shaped strands 50, may be produced.

Figure 13:
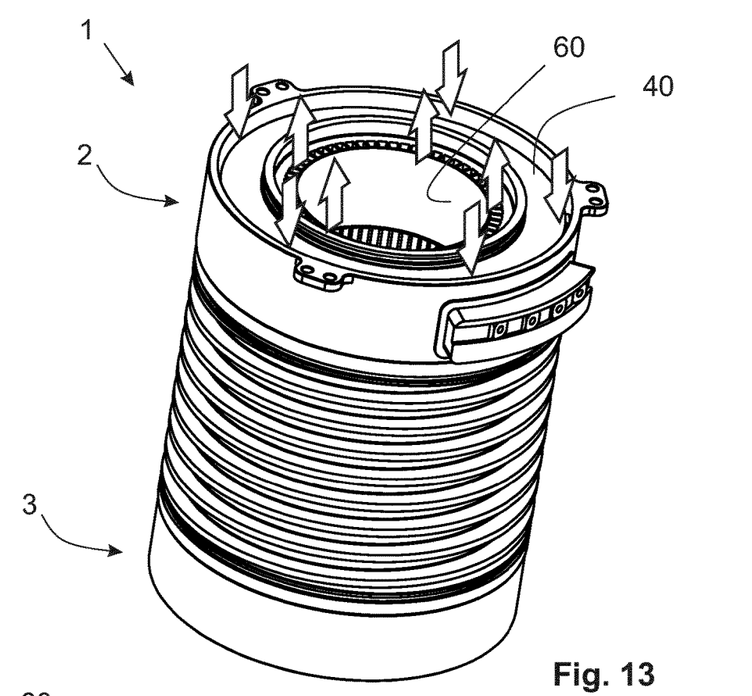
FIG. 13 schematically shows a perspective illustration of fluid inlets and fluid outlets for a cooling fluid flow of a stator.

FIG. 13 shows a perspective view of fluid inlets and fluid outlets for a cooling fluid flow of a stator 1.

In particular, arrangements may be made that a cooling fluid may enter and/or exit at the end face regions 2; 3 of the stator 1 (cf. directions of arrows in FIG. 13).

Preferably, the winding head or the assembled windings of the stator 1 may be cooled directly with the cooling fluid. Furthermore, the insulation disks 30 may be designed so as to allow a cooling fluid to flow through them.

Figure 14:
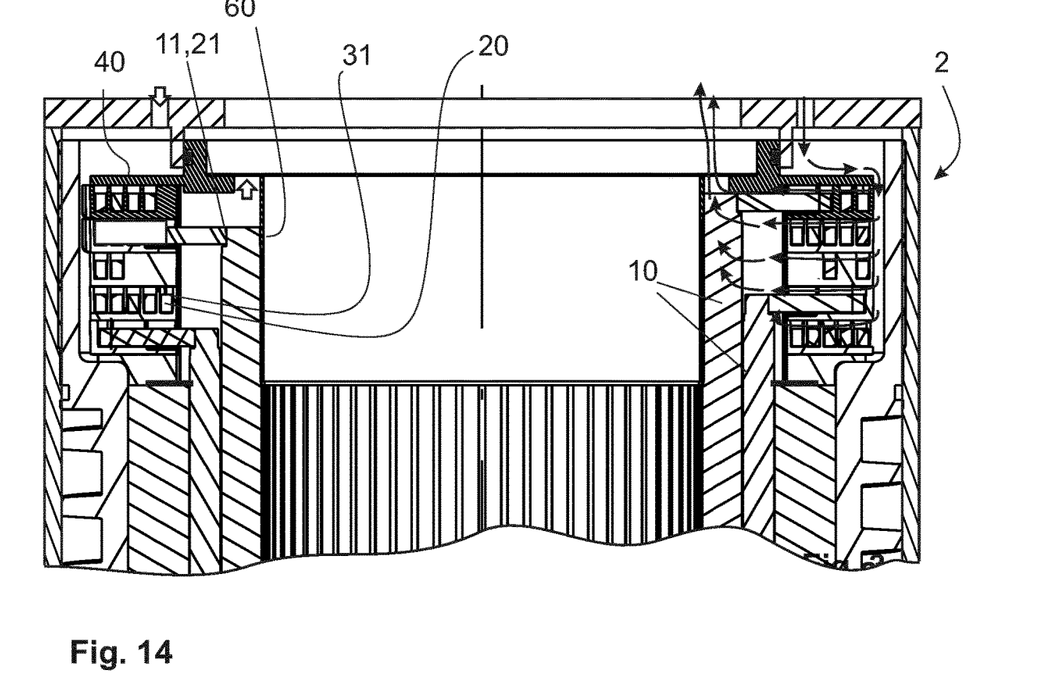
FIG. 14 schematically shows an illustration of a cooling fluid flow within the stator in a
  i. cross-sectional view.

FIG. 14 shows an illustration of a cooling fluid flow within the stator 1 in a cross-sectional view.

A cooling fluid may flow into the stator 1 at the end face region 2 of the stator 1 and pass through the cover part 40 to the insulation disks 30 (cf. directions of arrows in FIG. 14). Furthermore, the cooling fluid may flow through the insulation disks 30, for cooling the individual interconnection pieces 20 in the grooves 31 of the insulation disks 30.

Figure 15:
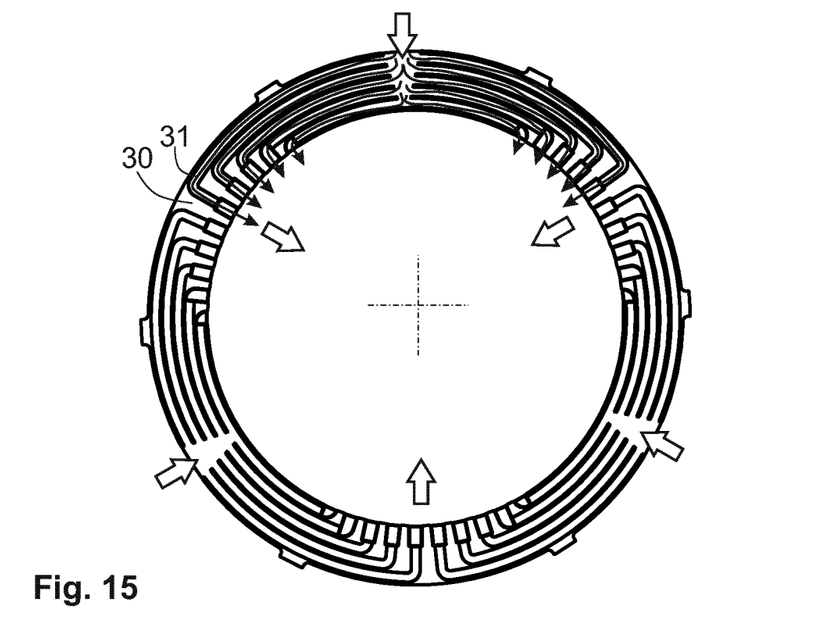
FIG. 15 schematically shows an illustration of cooling fluid flow in an isolation disk.

Referring to FIG. 15, an illustration of cooling fluid flow in an insulation disk 30 is illustrated. Accordingly, a cooling fluid may be split into a partial flow for each groove 31 or interconnection piece 20 received therein. Thus, an identical cooling effect may be provided for all interconnection pieces 20. Local temperature increases in the insulation disks 30 may be avoided.

Figure 16A:
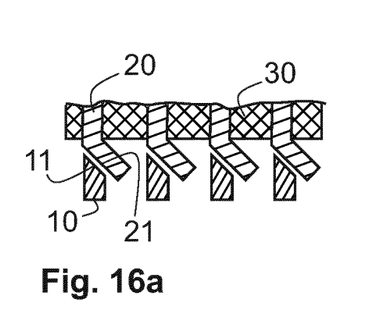
FIGS. 16*a-b* schematically show illustrations of pre-positioning for an angled geometry of the interconnect webs FIG. 16*c* schematically shows an interconnection piece with angled ends analogous to FIG. 16*a-b*
Figure 16B:
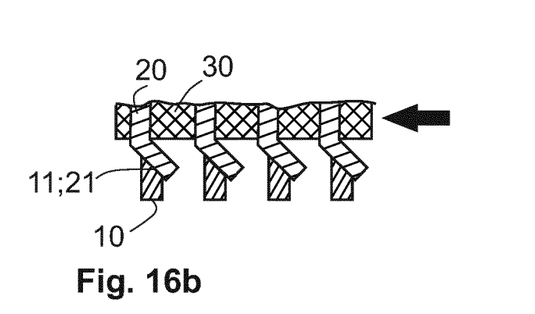

FIGS. 16a, 16b show, comparable to FIGS. 8, 9, a representation of the pre-positioning for interconnection pieces 20 with angled end face regions or angled contact surfaces 21 in a plan view perpendicular to the stator axis X. The angled areas, which form the contact surfaces of the interconnection pieces, are long, in particular longer than the corresponding contact surfaces 11 of the rod conductors 10. This means that even large tolerances may be compensated without affecting the quality of the electrical connection.

Figure 16C:
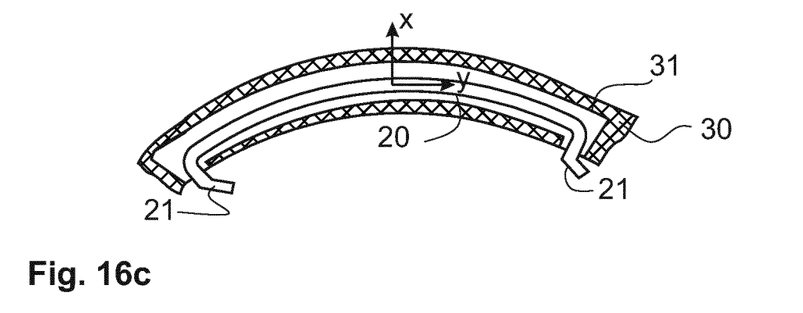
Figure 17A:
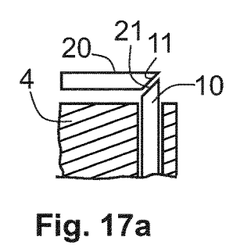
Figure 17B:
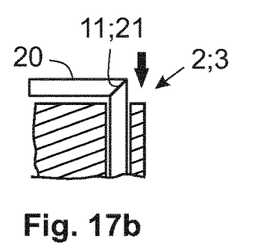
Figure 18A:
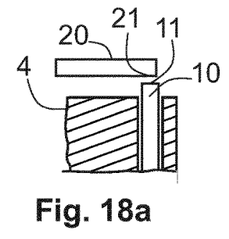
Figure 18B:
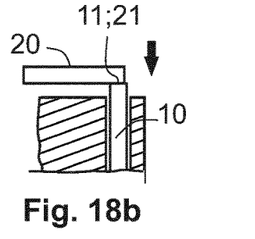
Figure 19A:
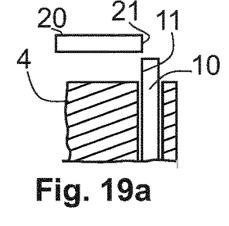
Figure 19B:
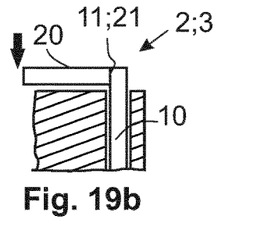

FIG. 16c shows an example of an interconnection piece 20 in a plan view, as it may be used in FIGS. 16a-b. The interconnection piece 20 is produced by cutting to length and then bending a semi-finished product with the cross-sectional shape of the interconnection piece, for example a copper rod.

In particular, the angled contact surfaces are formed by a bending process. This reduces the requirements for the cut-to-length process, since the cut-to-length process no longer has to provide functionally relevant surfaces. In contrast to, for example, FIGS. 16a, b, the rod conductor 10 is held with clearance in a groove 31 of an insulation disk 30. The interconnection piece may, thus, be moved laterally relative to the insulation disk. This allows tolerance dependencies for pre-positioning to be removed by twisting and/or axial placement and/or lateral movement. The clearance may be used or not used regardless of the selected shape of the interconnection pieces 20 or their contact surfaces 21.

FIGS. 17a-b, 18a-b, 19a-b each schematically show a contacting process to have contact surfaces 21, 11 of interconnection piece 20 and rod conductor 10 abut and to produce a zero gap, respectively, in a sectional plane parallel to and through the longitudinal axis X of the stator. For this purpose, the interconnection piece 20 is moved axially towards the rod conductor 10 fixed in the stator laminated core 4 or towards a stator end face 2;3. In FIG. 17, the interconnection piece 20 and the rod conductor 10 each have wedge-shaped ends. In FIGS. 18 and 19, ends of the interconnection piece 20 and the rod conductor 10 each have a cuboid block shape. The abutment or the formation of the zero gap are made here as a radial (FIG. 19) or axial (FIG. 18) butt joint. Insulation or retaining disks may be provided as in previous embodiments. An electrical connection may be made by welding. Welding may be performed axially and/or—in particular in the absence of axial accessibility, as can be seen, for example, from FIG. 18b—also obliquely. It is also conceivable and possible to weld through the interconnection piece 20 from axially above by using a suitable process such as electron beam welding.

Figure 20A:
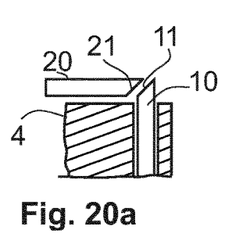
Figure 20B:
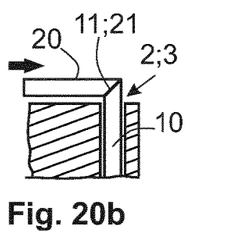
Figure 21A:
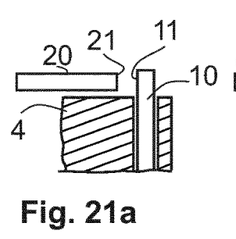
Figure 21B:
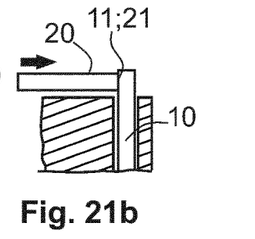
Figure 22A:
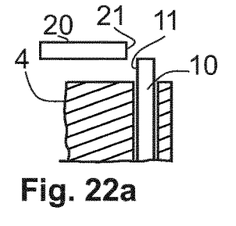
Figure 22B:
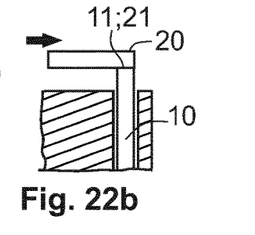

FIGS. 20-22 each schematically show a contacting process for abutting contact surfaces 21, 11 of the interconnection piece 20 against the rod conductor 10 or for producing a zero gap in a sectional plane parallel to and through the longitudinal axis X of the stator. Here, the feeding is lateral, i.e. in a direction of movement perpendicular to the longitudinal axis of the stator. For this purpose, the interconnection pieces 20 are held laterally in grooves of insulation disks (not shown) in a displaceable manner, preferably loosely or with clearance. The clearance may be in the x-direction, in the y-direction or a superposition of the two directions, cf. coordinates in FIG. 16c. The lateral displaceability allows tolerance chains to be reduced, in particular tolerance chains/dependencies between several interconnection pieces 20 may be broken. In order to establish the surface contact by lateral feed motion, only the interconnection pieces are moved en bloc radially inwards by, for example, a robot arm individually or by a gripping device that grips several interconnection pieces.

Figure 23:
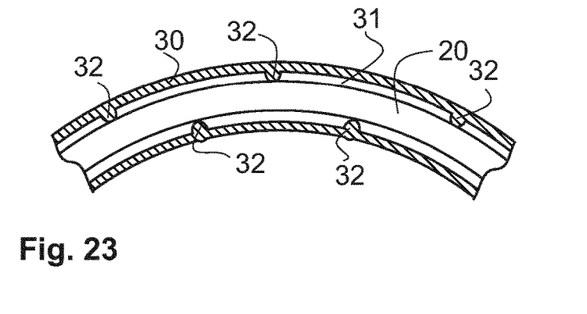
FIG. 23 schematically shows a possibility of holding the interconnection pieces by means of holding elements FIG. 24 schematically shows a possibility of manufacturing holding elements
Figure 24:
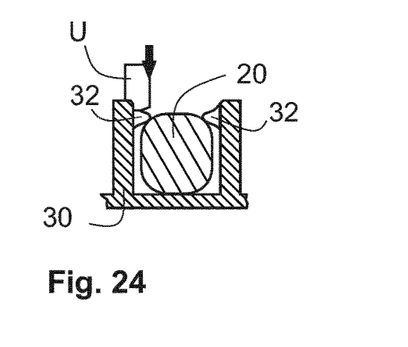

As shown in FIG. 23, the interconnection pieces 20 may be held by nubs or holding elements 32 in grooves 31 of insulation disks 30. The interconnection pieces 20 may be elastically deformed or stressed to bend for insertion into the grooves. The nubs may be formed by an injection molding process. The nubs may also be formed by an ultrasonic process. In particular, the nubs 32 may be formed after the interconnection pieces 20 have been inserted. FIG. 24 shows a fastening process, in which an interconnection piece is fastened by nubs 32. The nubs are created by an ultrasonic tool or ultrasonic punch U by reshaping them from the material of the insulation disk. In this way, interconnection pieces 20 may be secured in particular against falling out of the grooves.

In summary, the present invention may be used to simplify the manufacturing of a stator 1 that additionally has a reduced installation space.

In particular, a pre-positioning and contacting by means of a pre-stressed surface contact of the rod conductors 10 with the interconnection pieces 20 enables a reliable electrical connection for the generation of composite windings. Efficient assembly of the stator 1 is ensured.

By making electrical contact in different planes or interconnection planes, an assembly space-efficient arrangement may be achieved. In addition, advantageous temperature control is available, in particular by means of insulation disks 30, through which cooling fluid may flow.

LIST OF REFERENCE SIGNS

1 Stator
2 End face region of the stator
3 End face region of the stator
4 Stator laminated core
10 Rod conductor
11 Stator contact surface
20 Interconnection piece
21 Interconnection piece contact surface
30 Insulation disk
31 Groove
32 Retaining element
40 Cover part
50 Shaped strand
60 Insulation star
E Electrodes (of a resistance welding device)
U Ultrasonic tool
X Rotation axis

The invention claimed is:

1. A stator for an electrical machine having a plurality of rod conductors, which are distributed radially about an axis of rotation of the stator and are arranged spaced apart from one another in each case, so that the rod conductors extend in the longitudinal direction of the axis of rotation, and having at least one insulation disk, which is arranged in an end face region of the stator,
wherein the insulation disk has a plurality of interconnection pieces, in each case one interconnection piece being assigned to two rod conductors for forming an electrical connection,
wherein a rod contact surface is formed at longitudinal ends of each rod conductor and interconnection piece contact surfaces are formed at ends of each interconnection piece,
wherein the rod contact surfaces and the interconnection piece contact surfaces are each formed to correspond to one another so as to enable a surface contact,
wherein the interconnection pieces protrude in the radial direction from the insulation disk at least along the interconnection piece contact surfaces, thereby enabling a plurality of interconnection piece contact surfaces to be contacted simultaneously with the respectively associated rod conductor contact surfaces,
wherein the interconnection pieces and the rod conductors form a resilient connection, for providing a preloaded surface contact between the mutually associated rod conductor contact surfaces and interconnection piece contact surfaces,
wherein the longitudinal ends of the interconnection pieces are wedge-shaped in an axial plan view or angled, wherein angled means that the contact surface of the interconnection piece forms an angle with the tangent of a circle perpendicular to the stator axis and around the stator axis with a radius such that the radius passes through the contact surface of the interconnection piece,
wherein the angle is not equal to an even multiple of 90°.

2. The stator according to claim 1, wherein the rod conductor contact surfaces and the respectively associated interconnection piece contact surfaces are configured to be contacted with one another by rotating the insulation disk along the axis of rotation of the stator.

3. The stator according to claim 2, wherein the at least one insulation disk has a plurality of grooves for receiving the interconnection pieces, or the plurality of interconnection pieces is integrally cast in the insulation disk.

4. The stator according to claim 3, wherein the insulation disk comprises a resin or polymer for producing the insulation disk in a casting process.

5. The stator according to claim 1, wherein the at least one insulation disk has a plurality of grooves for receiving the interconnection pieces, or the plurality of interconnection pieces is integrally cast in the insulation disk.

6. The stator according to claim 5, wherein the insulation disk comprises a resin or polymer for producing the insulation disk in a casting process.

7. The stator according to claim 5, wherein the insulation disk comprises a castable or injectable resin or polymer for producing the insulation disk in a casting process.

8. The stator according to claim 1,
wherein the interconnection pieces that are in contact with the rod conductors form a zero gap along the interconnection piece contact surfaces and the rod conductor contact surfaces in each case, thereby enabling the interconnection pieces to be connected to the associated rod conductors in a force-locking or form-locking or material-locking manner, by means of a beam welding process, a resistance welding process, an ultrasonic welding process or a friction welding process.

9. The stator according to claim 1, wherein across the height of the rod conductor contact surfaces, the rod conductors are each designed to be point-symmetrical in cross section, in the form of a parallelogram, thereby enabling identical current path lengths to be present across the cross section of the rod conductors.

10. An Electrical machine comprising a rotor and a stator according to claim 1.

11. A method of manufacturing a stator or an electric machine according to claim 1, comprising the following steps:
concentrically aligning the insulation disk with respect to the plurality of rod conductors radially distributed around the axis of rotation and spaced apart from each other, respectively;
placing the insulation disk on a front end face of the stator so that a rod conductor contact surface and an interconnection piece contact surface are each opposite to each other;
rotating the insulation disk about the axis of rotation so as to establish a surface contact between the rod conductor contact surfaces and the interconnection piece contact surfaces.

12. The method according to claim 11, wherein the rod conductors and interconnection pieces assigned to one another are connected to one another, in particular welded, along the rod conductor contact surfaces and interconnection piece contact surfaces that are in contact with one another in a force-locking or form-locking or material-locking manner.

13. The method according to claim 12, wherein the interconnection pieces are connected to the associated rod conductors in a force-locking or form-locking or material-locking manner after positioning of the cover part.

14. The method according to claim 11, wherein a cover part is placed on the insulation disk.

15. The stator according to claim 1, wherein the insulation disk is a annular insulation disk.

16. The stator according to claim 4, wherein the interconnection pieces that are in contact with the rod conductors form a zero gap along the interconnection piece contact surfaces and the rod conductor contact surfaces in each case, thereby enabling the interconnection pieces to be connected to the associated rod conductors in a force-locking or form-locking or material-locking manner, by means of a beam welding process, a resistance welding process, an ultrasonic welding process or a friction welding process.

17. The stator according to claim 16, wherein across the height of the rod conductor contact surfaces, the rod conductors are each designed to be point-symmetrical in cross section, in the form of a parallelogram, thereby enabling identical current path lengths to be present across the cross section of the rod conductors.

* * * * *